(12) United States Patent
Chaji

(10) Patent No.: US 11,145,245 B2
(45) Date of Patent: *Oct. 12, 2021

(54) DISPLAY SYSTEM USING SYSTEM LEVEL RESOURCES TO CALCULATE COMPENSATION PARAMETERS FOR A DISPLAY MODULE IN A PORTABLE DEVICE

(71) Applicant: Ignis Innovation Inc., Waterloo (CA)

(72) Inventor: Gholamreza Chaji, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,676

(22) Filed: Dec. 17, 2018

(65) Prior Publication Data

US 2019/0122605 A1 Apr. 25, 2019

Related U.S. Application Data

(63) Continuation of application No. 14/681,371, filed on Apr. 8, 2015, now Pat. No. 10,192,479.

(60) Provisional application No. 61/976,910, filed on Apr. 8, 2014.

(51) Int. Cl.
*G09G 3/3208* (2016.01)
*G09G 3/00* (2006.01)
*G06F 9/50* (2006.01)

(52) U.S. Cl.
CPC ......... *G09G 3/3208* (2013.01); *G06F 9/5016* (2013.01); *G06F 9/5022* (2013.01); *G06F 9/5027* (2013.01); *G06F 9/5094* (2013.01); *G09G 3/006* (2013.01); *G09G 2320/043* (2013.01); *G09G 2320/0693* (2013.01); *G09G 2330/021* (2013.01); *G09G 2330/027* (2013.01)

(58) Field of Classification Search
CPC ........ G09G 3/006; G09G 3/3208; G09G 3/32; G09G 2320/04; G09G 2320/043; G09G 2320/045; G09G 2320/048; G09G 2320/0693; G09G 2320/08; G09G 2330/02; G09G 2330/021; G09G 2330/027; G06F 1/32; G06F 1/3212; G06F 1/3203; G06F 1/3265; G06F 1/329; G06F 9/50–5094

See application file for complete search history.

(56) References Cited

U.S. PATENT DOCUMENTS

| | | | | |
|---|---|---|---|---|
| 8,466,859 B1* | 6/2013 | Herz | ..................... | G09G 3/3648 345/102 |
| 2003/0201727 A1* | 10/2003 | Yamazaki | .............. | G09G 3/006 315/169.1 |
| 2006/0017669 A1* | 1/2006 | Cok | ..................... | G09G 3/3216 345/77 |

(Continued)

*Primary Examiner* — Keith L Crawley
(74) *Attorney, Agent, or Firm* — Stratford Group Ltd.

(57) ABSTRACT

A system including a display module and a system module. The display module is integrated in a portable device with a display communicatively coupled to one or more of a driver unit, a measurement unit, a timing controller, a compensation sub-module, and a display memory unit. The system module is communicatively coupled to the display module and has one or more interface modules, one or more processing units, and one or more system memory units. At least one of the processing units and the system memory units is programmable to calculate new compensation parameters for the display module during an offline operation.

20 Claims, 1 Drawing Sheet

(56) References Cited

U.S. PATENT DOCUMENTS

| | | | |
|---|---|---|---|
| 2006/0284802 A1* | 12/2006 | Kohno | G09G 3/3225 345/76 |
| 2007/0290957 A1* | 12/2007 | Cok | G09G 3/3225 345/77 |
| 2009/0109230 A1* | 4/2009 | Miller | G06F 1/3203 345/506 |
| 2010/0080218 A1* | 4/2010 | Kwa | G06F 3/14 370/389 |
| 2012/0229526 A1* | 9/2012 | Holmes | G06F 3/14 345/690 |
| 2012/0299973 A1* | 11/2012 | Jaffari | G09G 3/3208 345/690 |
| 2012/0320075 A1* | 12/2012 | Silk | G06F 3/14 345/581 |
| 2013/0194199 A1* | 8/2013 | Lynch | G06F 3/0412 345/173 |
| 2014/0085170 A1* | 3/2014 | Park | G09G 5/02 345/83 |
| 2014/0111567 A1* | 4/2014 | Nathan | G09G 3/3233 345/694 |
| 2014/0168184 A1* | 6/2014 | Kim | G09G 3/3258 345/209 |
| 2014/0176516 A1* | 6/2014 | Kim | G09G 3/3233 345/204 |
| 2014/0198114 A1* | 7/2014 | Nambi | G09G 3/36 345/522 |
| 2014/0320475 A1* | 10/2014 | Shin | G09G 3/3275 345/212 |
| 2015/0002502 A1* | 1/2015 | Kim | G09G 3/3233 345/212 |
| 2015/0097876 A1* | 4/2015 | Park | G09G 3/3225 345/691 |
| 2015/0187273 A1* | 7/2015 | Chang | G09G 3/3233 345/690 |
| 2015/0187328 A1* | 7/2015 | Kim | G09G 5/02 345/690 |
| 2015/0195153 A1* | 7/2015 | Ahmed | H04L 67/10 709/226 |
| 2015/0228219 A1* | 8/2015 | Noiman | G09G 3/32 345/102 |
| 2015/0279324 A1* | 10/2015 | Ohta | G09G 3/3283 345/690 |

* cited by examiner

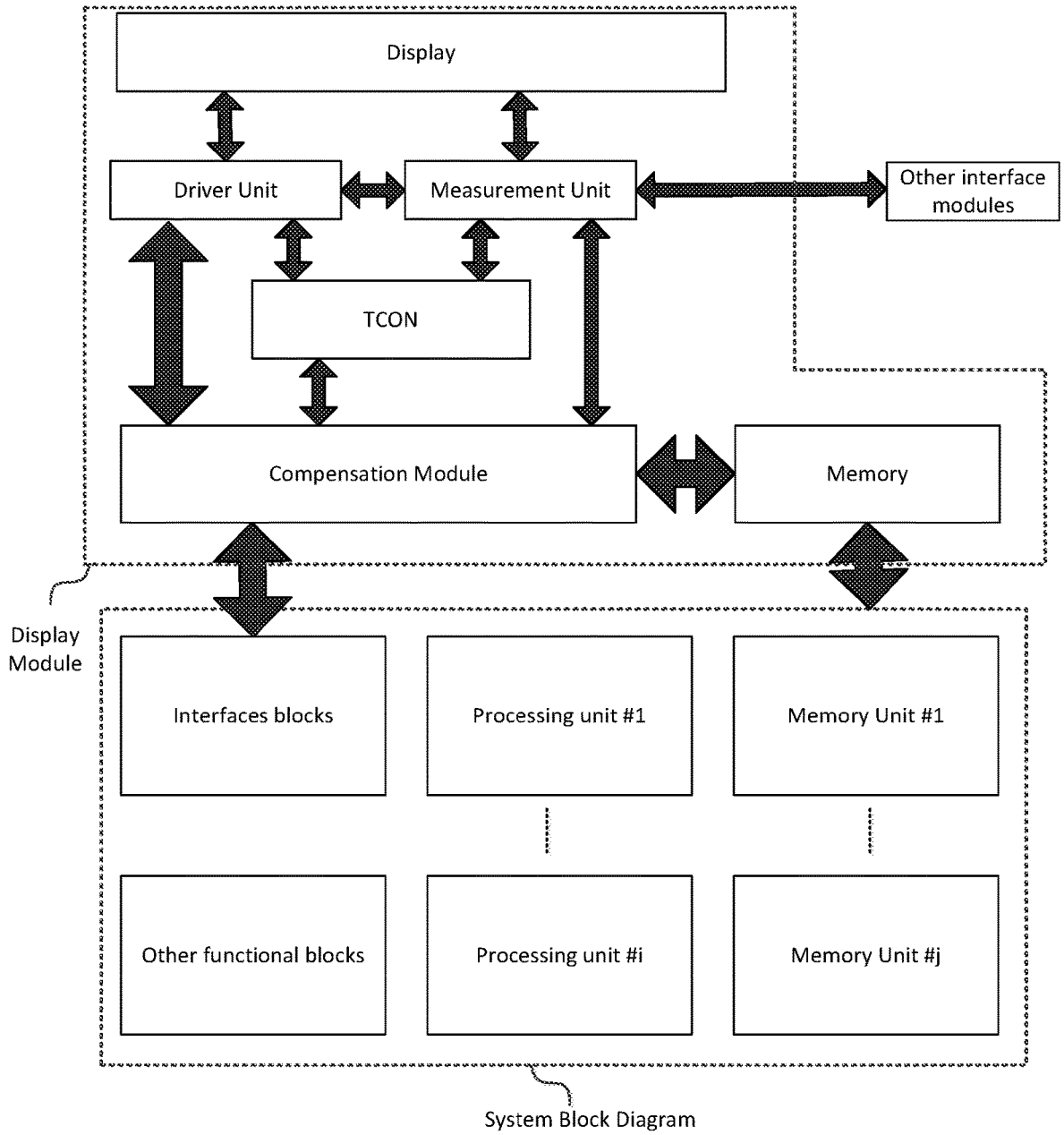

ions, measurement of an electronic video display panel (such as an organic light emitting or OLED display) is moved to an offline stage. Accordingly, such a timing controller ("TCON"), a measurement scheduler, a calculation module, a driver circuitry, and a memory interface become much simpler.

DISPLAY SYSTEM USING SYSTEM LEVEL RESOURCES TO CALCULATE COMPENSATION PARAMETERS FOR A DISPLAY MODULE IN A PORTABLE DEVICE

CROSS REFERENCE TO RELATED APPLICATION

This application is a continuation of U.S. patent application Ser. No. 14/681,371, filed Apr. 8, 2015, now allowed, which claims the benefit of U.S. Provisional Patent Application No. 61/976,910, filed Apr. 8, 2014, entitled "Display System with Shared Level Resources for Portable Devices", which are hereby incorporated by reference herein in their entireties.

BACKGROUND OF THE INVENTION

As discussed in previous documents and patents, IGNIS Maxlife™ implementations can compensate for both organic light emitting device (OLED) and backplane issues including aging, non-uniformity, temperature, and so on. Calculations of compensation factors are performed with dedicated resources of an electronic video display.

BRIEF SUMMARY

To bring MaxLife™ complexity to a comfort level of portable electronic device applications, measurement of an electronic video display panel (such as an organic light emitting or OLED display) is moved to an offline stage. Accordingly, such a timing controller ("TCON"), a measurement scheduler, a calculation module, a driver circuitry, and a memory interface become much simpler.

BRIEF DESCRIPTION OF THE DRAWINGS

FIG. 1 is a diagrammatic illustrating integration of a MaxLife™ display into portable electronic devices, such as mobile devices (smartphones) or handheld tablet computers.

DETAILED DESCRIPTION

A system level simplification includes a plurality of possible modifications and simplifications, as described in the following table according to each module or block by way of example:

| | Example Functions |
|---|---|
| TCON | Only focused on either driving the OLED pixels or measurement of the pixel circuits at a time<br>No correction is needed to eliminate the effect of measurement on driving and vice versa. |
| Measurement Scheduler | Everything can happen sequentially and so switching between different measurement methods is very simple. |
| Calculation module | System resources can be used to calculate part of (or all of) the new compensation value for each pixel circuit during offline modes. |
| Driver Circuitry | Drivers that drive each of the pixel circuits do not need to support different timing at the same time. |
| Memory interface | System memory can be used for calculations and so only storage memory will be needed. |

While the electronic video display of the portable electronic device can have dedicated blocks for all the functions such as calculating the compensation values, and controlling the measurement scheduler, some of the above blocks can be shared with or offloaded to system level resources to simplify the overall integrated system. In reference to FIG. 1, a system configuration is illustrated in connection with electronic displays. According to the example of FIG. 1, a typical system of a portable electronic device includes multiple processing units such as generic processors, graphic processors, etc. Additionally, multiple memory blocks are used in a typical system. The data can be sent from the system through interface blocks to one or more electronic displays. There are two main sections in the system configuration shown in FIG. 1: a display module and a system block. The display module includes a substrate that carries the pixels used to display information from the portable electronic device. The system block is physically arranged on one or more substrates separate from the substrate carrying the display module. One or more connector cables can interface the display module with the system block to communicate information, power, and/or data therebetween.

The electronic display can include a compensation block, a timing controller, a memory unit, and a measurement unit that can be shared with other interface modules, such as an electronic touch screen. During offline operation of the portable electronic device (e.g., when the portable electronic device is in a standby mode), the system processing and memory units of the portable electronic device can be used to perform display or pixel measurements (e.g., measurements of individual or sets of pixel circuits in the OLED display of the portable electronic device) and to calculate new compensation parameters while the portable electronic device is in an offline operation (e.g., the display is dark or not emitting light). Additionally, at least one or more of the pixel measurements can be done during an inline operation (e.g., while pixels of the electronic video display are emitting light) of the portable electronic device, using system resources or display resources. The measurements and compensations can be carried out using any conventional technique previously described, such as in previous documents and patents assigned to Ignis Innovation Inc.

The interface between system block diagram and display memory for updating some of the parameters can be achieved through the main memory bus or through the display video interface. When the OLED display is in a compensation mode, the main video interface can be used to transfer the parameters to the display memory or to receive the measurement values from the display. Additionally, some of these interfaces can be shared with other blocks, such as an electronic touch screen commonly found on mobile devices and tablet computers.

To reduce the power consumption during calibration of the electronic display of the portable electronic device, only those resources required for calibration stay powered ON, with the reset going to power saving mode (where the applicable resources work at lower operating frequency or lower operating voltage) or shutting down completely. The terms measurement, driving, calibration, and compensation have the meanings as those of ordinary skill in the art of OLED display technology would understand and use those terms. They refer to different functions, each of which is well known to the OLED display designer.

In addition, the available resources, such as battery range, can be a factor to enable the display calibration. For example, if the battery charge is less than a threshold, the display calibration can be put on hold until the battery is charged or the battery of the portable electronic device is being charged. According to another example, a multi-tiered compensation system depends on available resources that include having a battery lower priority compensation (or calibration), which can be postponed. In other words, compensations can be carried out according to their assigned priority level and available battery charge (and, by implication, available resources).

The compensation or calibration or both can be prioritized based on one or more parameters, area, color, or last calibration time. For example, in reference to emissive displays, blue OLED sub-pixels age faster than other sub-pixels (such as red and green), and, as such, blue OLED sub-pixels can have a higher priority than other sub-pixels (which are assigned respective lower priorities).

According to another feature, priority can be assigned based on static images. For example, some areas of the portable electronic display can have static images most of the time (e.g., in a periphery area of the display panel, such as a top or bottom section). These areas can have higher priority for calibration (compensation) purposes.

What is claimed is:

1. A portable electronic device comprising:
   a display module carried on a first substrate and integrated in the portable electronic device, comprising an electronic video display and a plurality of sub-modules, each only using display level resources of the first substrate, at least one of said plurality of sub-modules for controlling measurement of pixels; and
   at least one processing unit, included in a system module physically arranged on one or more substrates communicatively coupled to and separate from the first substrate, the at least one processing unit configured to execute system level applications of the portable electronic device and, as part of generating new compensation parameters, to perform said controlling measurement of pixels offloaded from said at least one of said plurality of sub-modules, using system level resources of the one or more substrates distinct from the display level resources.

2. The portable electronic device of claim 1, wherein the plurality of sub-modules of the portable electronic device comprise:
   a driver unit;
   a timing controller;
   a measurement unit;
   a compensation sub-module; and
   a display memory unit,
   and wherein the electronic video display is communicatively coupled to at least one of the driver unit, the measurement unit, the timing controller, the compensation sub-module, and the display memory unit, and wherein the system level resources include one or more system memory units of the one or more substrates.

3. The portable electronic device of claim 1, wherein said controlling measurement of pixels offloaded from said at least one of said plurality of sub-modules forms part of a compensation related operation the at least one processing unit shares with said at least one of said plurality of sub-modules.

4. The portable electronic device of claim 1, wherein said controlling measurement of pixels offloaded from said at least one of said plurality of sub-modules comprises controlling a measurement unit.

5. The portable electronic device of claim 1, wherein said at least one processing unit is further configured to perform calculations of the new compensation parameters with use of pixel measurements generated during said controlling measurement of pixels.

6. The portable electronic device of claim 1, wherein said at least one processing unit is configured to perform said controlling measurement of pixels offloaded from said at least one of said plurality of sub-modules during an offline operation in which the electronic video display is off.

7. The portable electronic device of claim 1, wherein the one or more substrates is communicatively coupled to said first substrate via a connector cable configured to interface the display module with the system module.

8. The portable electronic device of claim 5, wherein a display memory unit of the portable electronic device is updated with the calculated new compensation parameters from the system module via a main memory bus or a display video interface.

9. The portable electronic device of claim 1, wherein during a calibration of the electronic video display, only those resources required for the calibration remain powered on.

10. The portable electronic device of claim 1, wherein calibration of the electronic video display is carried out according to threshold criteria including battery charge and resource availability.

11. The portable electronic device of claim 1, wherein calibration of blue sub-pixels of the electronic video display is carried out according to a higher priority than a calibration of sub-pixels of the electronic video display of colors other than blue.

12. The portable electronic device of claim 1, wherein a measurement unit of the portable electronic device carries out measurements of pixels of the electronic video display using the system level resources or the display resources or both during an inline operation while pixels of the electronic video display are emitting light.

13. A method of operating a portable electronic device including, a display module carried on a first substrate and integrated in the portable electronic device including an electronic video display and a plurality of sub-modules, each only using display level resources of the first substrate, and at least one processing unit, included in a system module physically arranged on one or more substrates communicatively coupled to and separate from the first substrate, the method comprising:
   performing by at least one of said plurality of sub-modules, control of measurement of pixels;
   executing at the at least one processing unit, system level applications of the portable electronic device;
   offloading said control of measurement of pixels from said at least one of said plurality of sub-modules; and
   performing at the at least one processing unit, as part of generating new compensation parameters, said control of measurement of pixels offloaded from the at least one of said plurality of sub-modules, using system level resources of the one or more substrates distinct from the display level resources.

14. The method of claim 13, wherein said control of measurement of pixels offloaded from said at least one of said plurality of sub-modules forms part of a compensation related operation the at least one processing unit shares with said at least one of said plurality of sub-modules.

15. The method of claim 13, wherein said control of measurement of pixels offloaded from said at least one of said plurality of sub-modules comprises controlling a measurement unit.

16. The method of claim 13, further comprising, performing at the at least one processing unit calculations of the new compensation parameters with use of pixel measurements generated during said control of measurement of pixels.

17. The method of claim 13, wherein said performing at the at least one processing unit, said control of measurement of pixels offloaded from the at least one of said plurality of sub-modules is performed during an offline operation in which the electronic video display is off.

18. The method of claim 13, wherein the one or more substrates is communicatively coupled to said first substrate via a connector cable configured to interface the display module with the system module.

19. The method of claim 16, further comprising:
updating a display memory unit of the portable electronic device with the calculated new compensation parameters from the system module via a main memory bus or a display video interface.

20. The method of claim 13, further comprising:
carrying out, at a measurement unit of the portable electronic device, measurements of pixels of the electronic video display using the system level resources or the display resources or both during an inline operation while pixels of the electronic video display are emitting light.

\* \* \* \* \*